United States Patent [19]

Tillinghast et al.

[11] Patent Number: 5,785,413
[45] Date of Patent: Jul. 28, 1998

[54] DUAL LAMP FIXTURE WITH INTEGRAL CONTROL

[75] Inventors: Sean P. Tillinghast, Bexley; Daryl A. Popig, Columbus; Terry Dawson, Westerville, all of Ohio

[73] Assignee: Weldon Technologies, Inc., Hilliard, Ohio

[21] Appl. No.: 826,005

[22] Filed: Mar. 27, 1997

Related U.S. Application Data

[63] Continuation-in-part of Ser. No. 623,250, Mar. 28, 1996, abandoned.

[51] Int. Cl.[6] .................. F21M 15/00; F21M 33/00; B60Q 1/00
[52] U.S. Cl. .................. 362/228; 362/61; 362/227
[58] Field of Search .................. 362/61, 227, 228, 362/229, 800; 340/76, 471, 479, 902, 825.07; 315/313, 323

[56] References Cited

U.S. PATENT DOCUMENTS

| | | | |
|---|---|---|---|
| 3,732,540 | 5/1973 | Platte | 340/76 |
| 4,163,217 | 7/1979 | Wesemeyer et al. | 340/825.54 |
| 4,734,625 | 3/1988 | Geanous et al. | 315/313 |
| 4,734,697 | 3/1988 | Robinson et al. | 340/902 |
| 4,859,988 | 8/1989 | Holtvluwer | 340/471 |
| 4,930,049 | 5/1990 | Davenport et al. | 362/61 |
| 4,958,143 | 9/1990 | Knauff | 340/479 |
| 5,015,918 | 5/1991 | Copeland | 362/227 |
| 5,291,299 | 3/1994 | Karna | 315/323 |
| 5,452,188 | 9/1995 | Green et al. | 362/227 |
| 5,499,009 | 3/1996 | Davis | 340/479 |
| 5,608,290 | 3/1997 | Hutchisson et al. | 362/800 |

Primary Examiner—Ira S. Lazarus
Assistant Examiner—Matthew J. Spark
Attorney, Agent, or Firm—James R. Eley, Esq.

[57] ABSTRACT

A dual lamp fixture having an integral power supply and control circuit. The dual lamp fixture utilizes stroboscopic and incandescent lamps mounted near the focus of a parabolic reflector which may be actuated alternately, individually or simultaneously. Multiple lamps may be connected in parallel to a DC power bus and a differential line, twisted-pair communication bus to achieve a variety of controlled flashing patterns. Each lamp will perform its given tasks when an appropriate command signal is placed on the communication bus. To take full advantage of this distributed control and the advantages in bus-wiring topology, the power supply is located in close proximity to its controller and light fixture.

18 Claims, 4 Drawing Sheets

DUAL LAMP FIXTURE WITH INTEGRAL CONTROL

This application is a continuation-in-part of application Ser. No. 08/623,250, filed Mar. 28, 1996, now abandoned.

BACKGROUND OF THE INVENTION

The present invention is directed generally toward vehicle lights and more particularly toward a vehicle light having incandescent and strobe light sources which utilize a common reflector and lens assembly and which incorporates a high voltage power source for the strobe.

Light sources are widely used as visually perceptible signaling devices. Common examples are the braking and turning lights of vehicles, running lights on boats, snowmobiles or aircraft, emergency lights of police vehicles and ambulances, and lights employed by school buses for caution signals and stop lights. In all such uses, it is important that the light source have high visibility, such that a driver or other observer will notice the signal. On the other hand, a light source used as a signal should not be so attention-getting that it is overly distracting or otherwise impair the vision of those who see it.

Presently, the most common light signaling sources used on vehicles are incandescent lights. Differing colors and brightness' are generally employed to enhance visibility and to indicate certain kinds of signaling. For example, red is used to indicate the rear of an auto, whereas bright red indicates a braking auto. White lights on the rear of an auto are indicative of an auto that has been placed in reverse and yellow lights are used for parking lamps and turn signals. Some light sources are turned on when the signal is desired and turned off when it is no longer desired, such as the backing lights on an auto. Others light sources are turned on and off with a given frequency such as turn signal lights. Still others change from a base level of light intensity to a somewhat higher intensity as the message to be signaled changes, such as brake lights.

Emergency vehicles, such as ambulances and police vehicles, typically employ pulsing, high intensity, stroboscopic type lights to command attention. Similar high intensity lights are also used on aircraft or on high buildings. These lights can be quite effective as warning devices, but their brightness at close range can be so intense as to distract or to discomfort the observer.

A synchronized pulse-enhanced dual light source is disclosed in U.S. Pat. No. 4,958,143 to Robert J. Knauff. The disclosure teaches the combination of an incandescent and strobe lamp within a single lighthead. The lighthead includes control and power circuitry which accepts an external trigger signal. The control circuitry receives the trigger signal and proceeds to control the synchronization of the incandescent pulses with the strobe pulses. The controller pulses the strobe before the incandescent lamp achieves any substantial percentage of light output and in such close time proximity to the peak intensity of the incandescent lamp that persistence of vision in the human eye causes the two light sources to blend together visually. However, the timing and synchronization of the two light sources is not independently controllable from an external control system.

There is a need for a dual lamp fixture which may be externally synchronized with other lightheads and which permits control over the pattern with which the lamps are flashed or pulsed. The present invention provides for external control and synchronization of the lamps within the lighthead. An external control may be provided which has independent control over the incandescent and strobe lamps. For example, an external control may flash incandescent lamps only, strobe lamps only or both.

SUMMARY OF THE INVENTION

Previous dual lamp fixture have generally had limited light output due to the placement of the incandescent and strobe lamps which has tended to block each other's emissions to a common reflector and through the lighthead lens. Typically, dual source lightheads which were designed to avoid this problem, have used dual reflectors and lenses for separated incandescent and strobe lamps. However, dual reflector designs have been limited to use in larger lightheads. Since exterior space may be limited on a vehicle, such limitations may prevent the use of such a dual reflector design. The present invention avoids this problem by utilizing a standard incandescent lamp in combination with a toroidal strobe lamp. Each lamp of the present invention has direct access to the reflector and lens. Therefor, the light emitted from either lamp is not blocked by the other. Also, the present invention allows the use of a single reflector and lens assembly and thus permits a more compact package design. Since the improved dual lamp fixture of the present invention is not subject to the space limitations of previous designs, it may be installed in previously unavailable locations.

In order to operate strobe lamps, constant voltages in excess of 300 volts may be required with triggering voltages in excess of 6000 volts. Switching such high voltage lines may generate large amounts of radio-frequency interference (RFI) which has the potential of adversely affecting a vehicle's electrical system. A high degree of shielding insulation and filtering is generally required to minimize such RFI.

The present invention enables one to avoid the transmission of high voltages throughout a vehicle's wiring harness by locating strobe power supplies within the housing of each strobe lighthead. A central control module associated with the present invention provides for the triggering of the strobes but would not produce the high voltages which are required to operate strobe lamps. Rather, the power supply at the lighthead produces the necessary strobe voltage. Thus, the present invention eliminates the need for high voltage lines and avoids the problems inherent with such lines.

Also provided by the present invention is the ability to communicate with any controller utilizing the appropriate binary data format and timing. A simple micro-controller may be used to interface to the driver's compartment in a vehicle and broadcast general function commands upon specific input selections. The dual lamp fixtures can receive this data and act upon it in a manner indicative of the function command and a group address assigned to the lamp fixture.

It is to be appreciated that the present invention may be adapted for use in lightheads with multiple reflectors or lenses with the possibility of multiple color output. For example, the present invention may be utilized in a dual reflector/lens lighthead. In such an application, the lighthead may have two sets of incandescent and strobe lamps, one set for each reflector. Such dual reflector/lens designs would permit two different colors to be used in the same lighthead.

These and other advantages will be readily apparent to those skilled in the art based upon the disclosure contained herein. For a fuller understanding of the nature and objects of the invention, reference should be had to the following detailed description taken in connection with the accompanying drawings.

DETAILED DESCRIPTION

It is to be understood that while the following is a description of a dual lamp fixture used in an emergency vehicle, such as an ambulance, the present invention may be utilized anywhere such a fixture may be of service.

Figure 1:
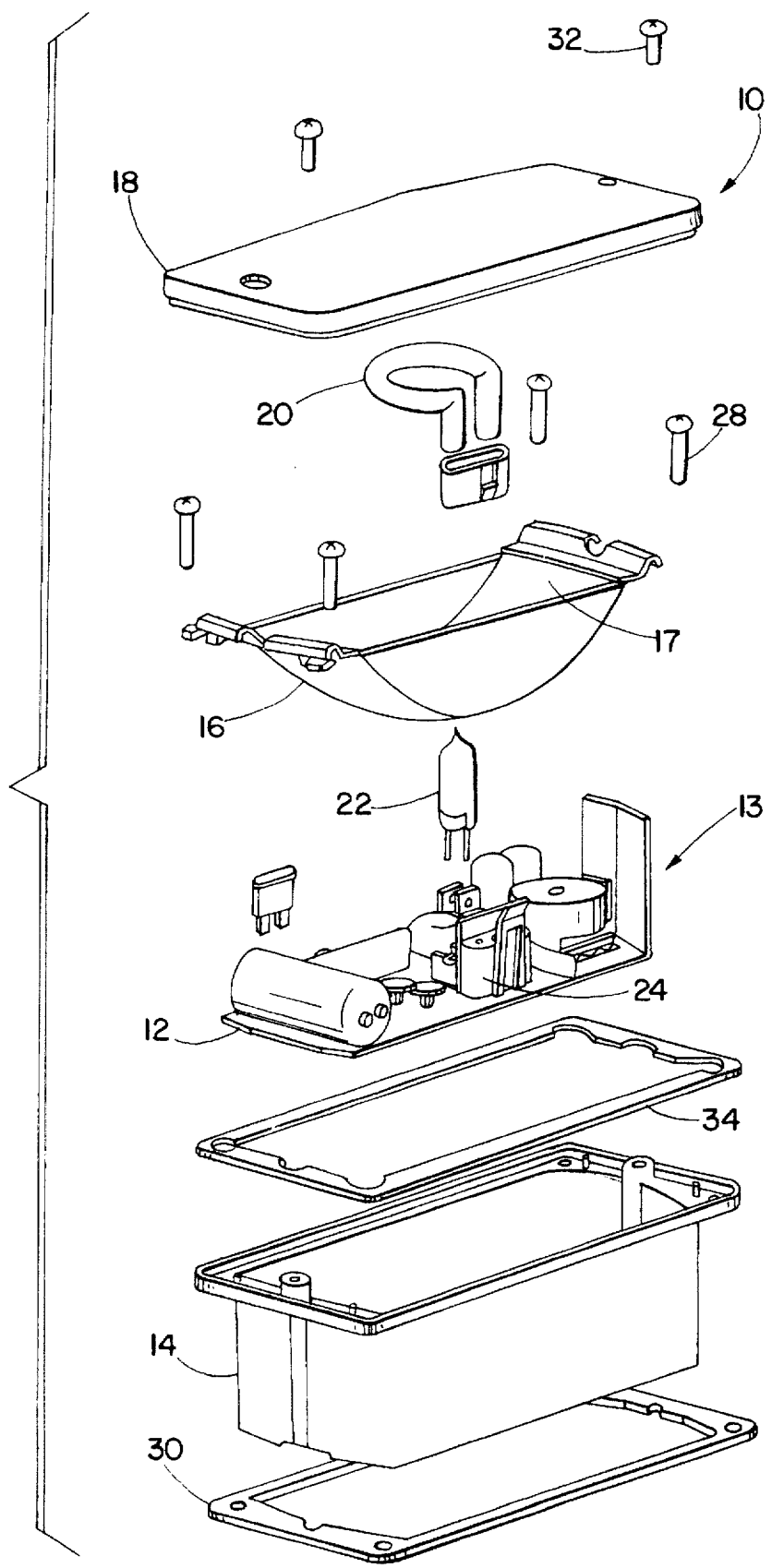
FIG. 1 is a perspective exploded view of one embodiment of a lamp fixture assembly of the present invention.
Figure 3:
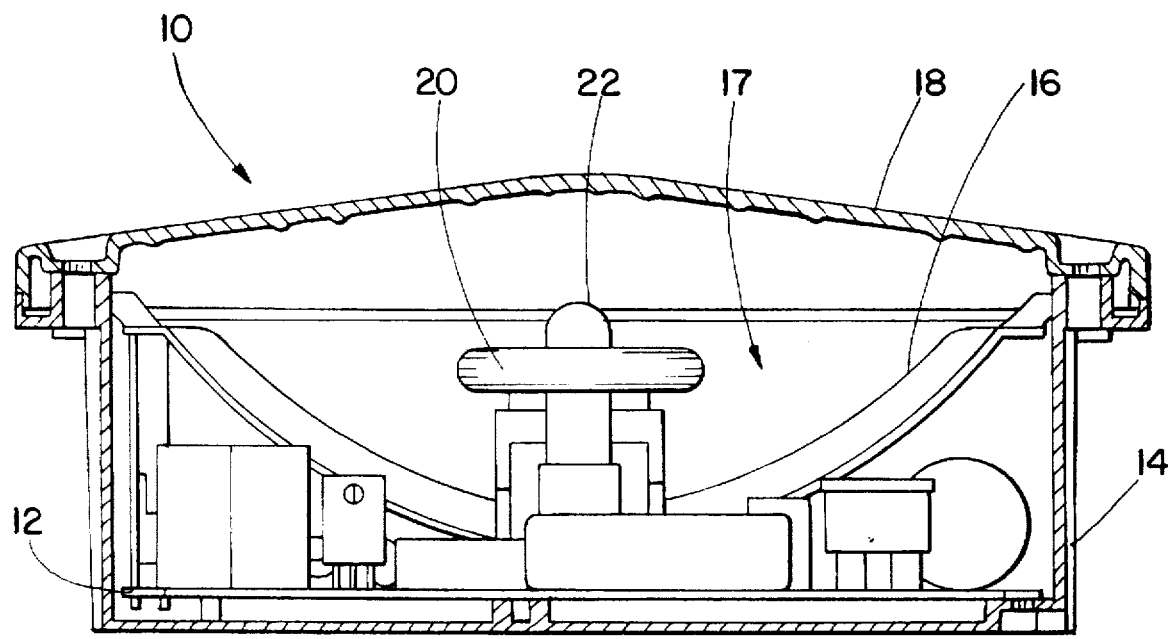
FIG. 3 is a cross-sectional plan view of one embodiment of the lamp fixture assembly of the present invention.

Referring to FIGS. 1 and 3, one embodiment of the dual lamp fixture 10 is shown to have locally contained power supply/control circuitry mounted on a common printed circuit (p.c.) board 12 of such dimensions as to fit in standardized light fixture openings (not shown) utilized in some vehicle manufacture. In this regard, the fixture 10 may be easily retrofitted into a great number of existing applications. Circuit assembly 13 may be installed internal to housing 14 with reflector 16 affixed to the housing 14 intermediate said circuit assembly 13 and lens 18. The strobe tube 20 and the incandescent bulb 22 may be installed to sockets, as at 24, mounted to the circuit assembly 13 through an opening 26 in the reflector 16. The reflector 16 is secured to housing 14 when assembled fixture 10 is mounted to the vehicle body (not shown) using fasteners, such as mounting screws 28. A gasket 30 is employed intermediate housing 14 and the vehicle body to form a weather seal. The lens 18 may be attached to housing 14 using fasteners, such as screws 32, with an intermediate gasket 34, once again being provided for effecting a weather seal. Additionally, secondary optical and color filter lenses (not shown) may be employed between reflector 16 and lens 18 to diversify the functionality and intended use of the dual lamp fixture 10.

Figure 2:
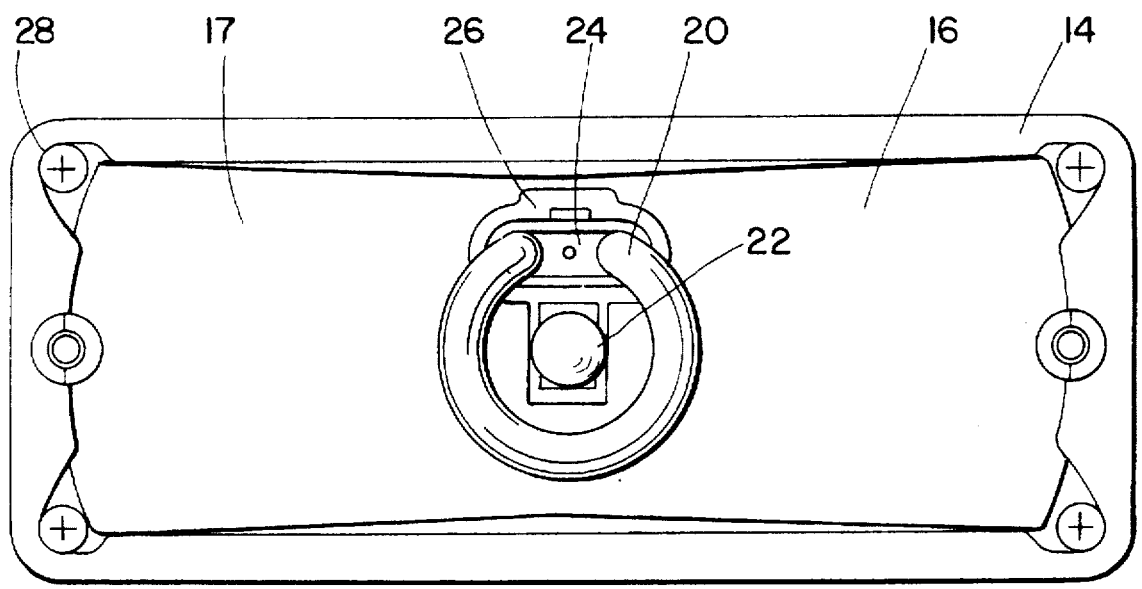
FIG. 2 is a front elevation view of one embodiment of the lamp fixture assembly of the present invention without the lens.

Referring next to FIG. 2, the reflector 16 and lighting arrangement of lamps 20 and 22 shown with lens 18 removed. A high intensity lamp, such as a toroidal strobe tube 20, is preferably concentrically aligned with a lower intensity lamp 22, such as a halogen or other incandescent lamp, and centered on the focus of the generally parabolic, reflective upper surface 17 of reflector 16. During operation of the lamps, the mirrored surface 17 of reflector 16 receives a portion of the flux emitted therefrom and directs that light energy through lens 18 where it may be visually perceived.

Figure 4:
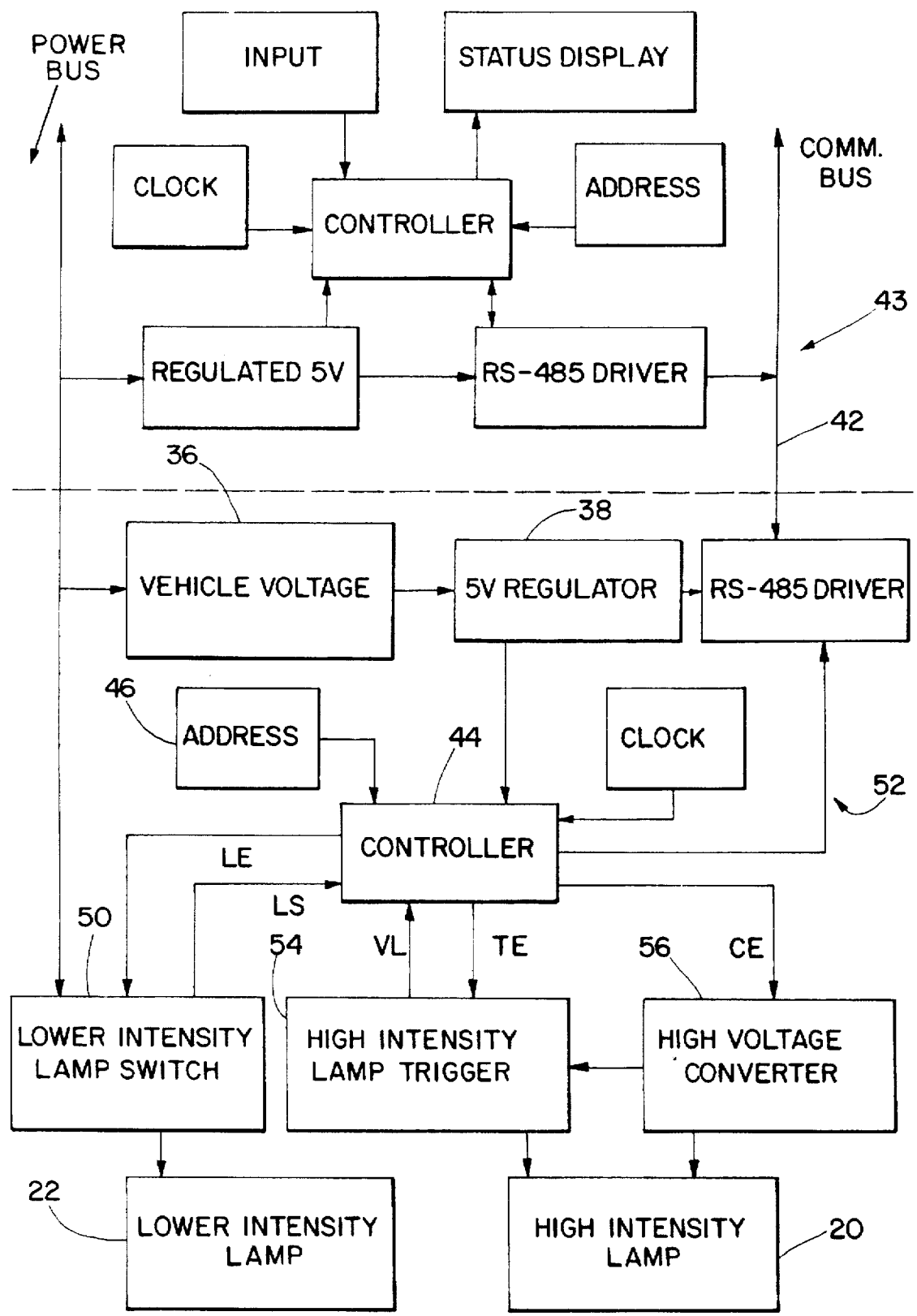
FIG. 4 is a block diagram of the electrical circuit of the present invention.
Figure 5:
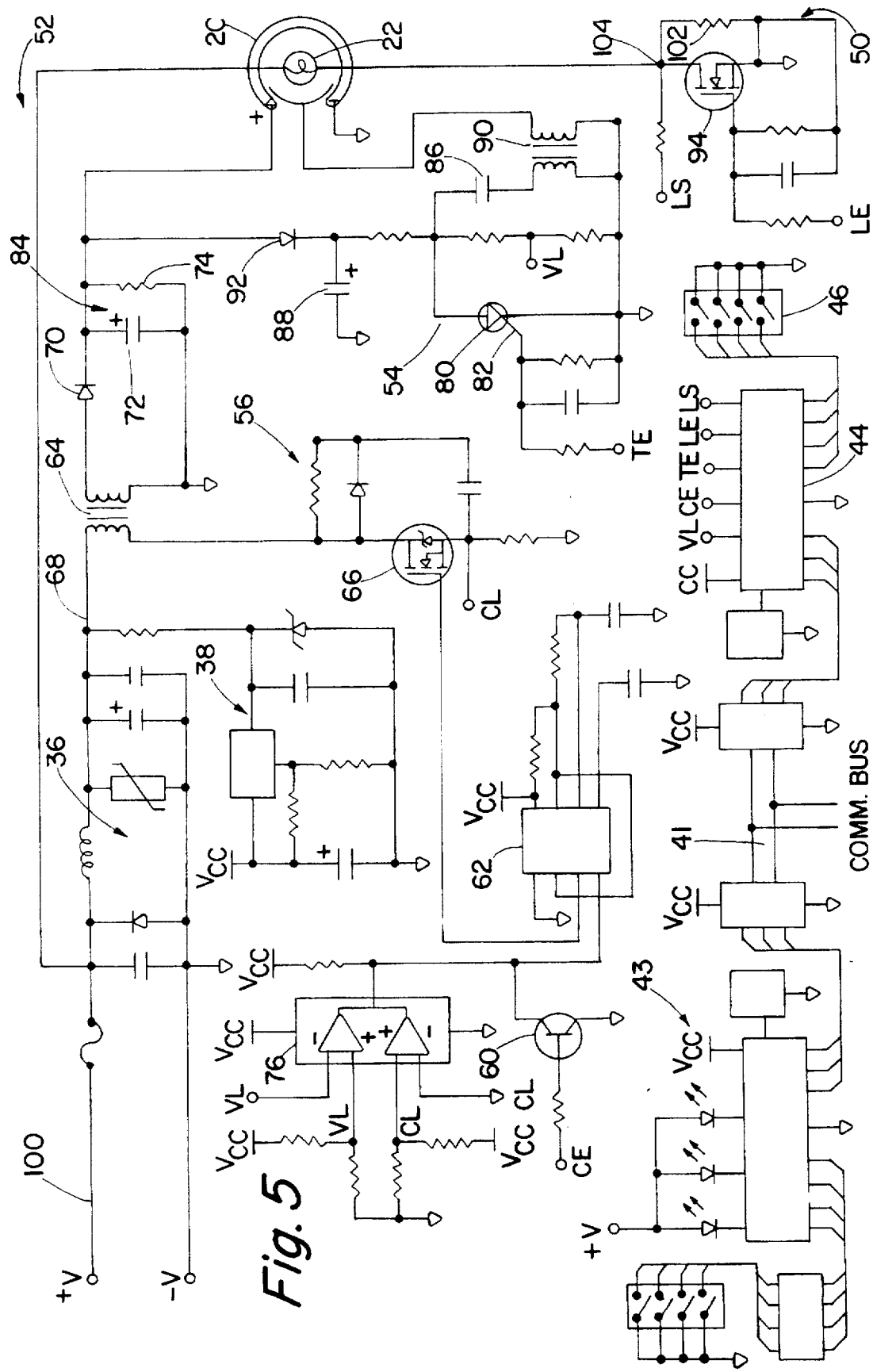
FIG. 5 is a schematic diagram of one embodiment of the present invention depicting the power supply and control circuit.

Referring now to FIG. 4, an embodiment of the lamp control circuit 52 of the present invention is generally represented in block diagrammatic form. The lamp control circuit 52 is preferably mounted as part of circuit assembly 13, and within lamp fixture 10, however, it must be appreciated that the circuit could be mounted externally, yet in proximity, to lamp fixture 10, without substantially detracting from the utility of the invention. Refer to FIG. 5 for a detailed description of the functioning of the lamp control circuit 52.

Referring additionally to FIG. 5, one embodiment of the lamp control circuit 52 of the present invention is specifically represented there by an electrical schematic diagram.

The lamp control circuit 52 includes inputs for the vehicle DC power source 100, typically +12 Vdc, and ground, and a differential twisted-pair data line 41 for communication with an external control circuit, such as at 43. The lamp control circuit 52 is provided with a power and radio frequency interference (RFI) filter network, shown generally at 36, to produce conditioned power to the high voltage (h.v.) converter 56 and regulator circuit 38. Filter 36 also reduces the amount of noise generated by the h.v. converter 56 that is sent back through the vehicle power bus.

Operation of the circuit is governed by controller 44, such as may be supplied as a micro-controller or a microprocessor, which is in communication with the high voltage h.v. converter 56 and trigger circuit 54, low intensity lamp switch means 50, as well as an external control circuit 43. In general, upon system power-up and initialization, controller 44 awaits a command signal from an external source, such as external control circuit 43. Once a valid command is received by the controller 44 from external control circuit 43, it actuates specific elements of the h.v. converter 56, trigger circuit 54 and low intensity switching means 50 to generate a predefined flash pattern corresponding to the specific command received and which relates to the function-specific class of lamp fixture. In operation, it is expected that a plurality of dual lamp fixtures will be employed in an overall vehicle lighting system, each having its own function-specific identity established by setting address switch 46 and being controlled, overall, by external control circuit 43.

Referring additionally to FIG. 4, dual lamp fixture circuit 52 and external control circuit 43 are shown as functional block form with the direction of logic flows being indicated by arrows. Program instructions stored within control circuit 44 and external controller 43 allows the lamp fixture 10 to interpret its physical address, set by address switches 46, as being specific or generic. If group (more than one lamp fixture) addressing is desired, lamp fixture 10 will receive each interpretable command from the external control circuit 43 and respond to it in accordance with the lamp fixture's group address. In an embodiment of the invention in which the fixtures are components in a distributed network, the commands issued by the external control circuit 43 are address-specific, therefore the lamp fixtures as at 10 will only receive and respond to commands which include the respective lamps (set by switches 46).

Operation of the high voltage converter 56 is initiated when controller 44 issues a logic low to the base of NPN transistor 60 via converter enable output, designated as CE, which allows the reset pin of oscillator 62 to be pulled high, thus allowing the oscillator to run. The controller 44 issues a logic high to disable oscillator 62 by pulling reset pin low via the NPN transistor 60.

High voltage, which in the preferred embodiment is around 330 Vdc, is created through the secondary winding of high voltage (h.v.) transformer 64 when field effect transistor (FET) 66 is used, alternately, either to permit or to interrupt the current flow from the conditioned supply line 68. When the current flow through the primary winding of h.v. transformer 64 is interrupted, the collapsing electromagnetic field induces a current (the "flyback effect") in its secondary winding which is at a voltage level proportional to its winding ratio. The voltage produced through the secondary winding is rectified by rectifying diode 70 and gradually charges a capacitor 72. Resistor 74 is placed in parallel with capacitor 72 to slowly drain the capacitor should it not be discharged after being initialized.

The current through the primary of h.v. transformer 64 is interrupted at a frequency controlled by oscillator 62 which drives the gate of the FET 66. The current through the primary is limited by comparing the voltage level at current limiting test point, designated CL, to a reference voltage taken from reference test point, designated CL', which is created by a voltage divider network. If the current limit is reached, i.e., CL exceeds the value of CL', comparator 76 detects the error and pulls the reset pin of oscillator 62 low, thus disabling its output and shutting down h.v. converter 56. Once the current limit error condition is no longer present, the comparator 76 releases the oscillator 62 and h.v. converter 56 restarts.

The high voltage is limited by comparing voltage limit test point, designated VL, in the circuit, which is proportional to the high voltage level, to a reference voltage level, designated VL'. Comparator 76 is also used to monitor these levels and hold oscillator 62 reset pin to ground in the presence of an error condition, that is when VL exceeds the value of VL'. The controller 44 also monitors the voltage at VL to determine if h.v. converter 56 is working properly. If VL fails to reach a predetermined voltage level shortly after CE is pulled low (enabling the converter), controller 44 will determine a h.v. converter error and load its status registers with that error so that it may be subsequently transmitted to an external control circuit 43 when polled.

In operation, a strobe trigger enable signal, designated as TE, is applied to the gate 82 of silicon controlled rectifier (SCR) 80, ultimately causing high intensity strobe tube 20 to flash. As previously explained, when h.v. converter 56 is enabled, pulse voltage circuit 84 and the trigger circuit 54 become energized. When SCR 80 is in an "off" state, capacitors 86 and 88 are charged in parallel with the pulse voltage circuit 84. In the presence of a trigger signal, TE, SCR 80 is turned "on" thus providing a path for the capacitor 86 to discharge which, in turn, generates an ionizing voltage through transformer 90 which is in electrical communication with the trigger lead of the strobe tube 20. This high voltage ionizes the gas within high intensity strobe tube 20. In the ionized state, the gas becomes conductive and permits pulse voltage stored in capacitor 72 to discharge through strobe tube 20, thus producing a flash of light. Capacitor 88 is provided to insure that capacitor 86 will quickly recharge after each trigger pulse. Diode 92 is provided in order to prevent capacitor 88 from being discharged through strobe tube 20.

Referring now generally to the area of FIG. 5 designated as 50, incandescent lamp 22 is connected to a switch, such as N-Channel FET 94, and to DC power source 100. When FET 94 is biased "ON" by the controller 44 via lamp enable signal, designated as LE, a circuit is completed to ground, providing sufficient current to illuminate lower intensity lamp 22. Lamp failure resistor 102 allows the detection of the failure of lamp 22 by maintaining the voltage at test point 104 "high" when the filament is intact and the FET 94 is "OFF." If the voltage test point 104 drops "low" and the FET 94 is off, then there is an open circuit which generally indicates a broken filament within lamp 22. In operation, the controller 44 monitors the lamp status voltage at test point 104, designated as LS, and sets an appropriate status register so that the functional condition of the low intensity lamp 22 may be provided to external controller 43 when it is requested.

As previously discussed, the controller 44 within dual lamp fixture 10 is typically in communication with, accepts commands from and issues circuit status information to an external control circuit 43. External control circuit 43 may be a simple micro-controller, having a limited number of instruction sets or a more versatile microprocessor which interfaces with the driver's compartment in a vehicle, such as an ambulance or other emergency vehicle. Upon selection of certain lighting functions by an operator of the vehicle, external control circuit 43 broadcasts corresponding commands on a communication bus 42 which are picked up by the appropriate internal controllers, as at 44, and acted upon in a predetermined manner as dictated by the group address assigned to that particular lamp fixture 10 via address switch 46. For example, an ambulance utilizes a series of warning lights which are divided into three distinct groups. Each group must flash synchronously with one another with a predetermined phase shift, or delay, between the other groups of lamps. Also, the intensity and operation of these groups varies depending upon the system function.

The following table illustrates the broadcast function originated by the external control circuit 43 and the group addressing which is evaluated by the controller 44 in each of the dual lamp fixtures 10. One embodiment of the invention provides for 16 distinct group addresses.

TABLE 1

| Lighthead Group Address | Function | | | |
|---|---|---|---|---|
| | Primary | Secondary | Auxiliary 1 | Auxiliary 2 |
| A - e.g. "0001" | Pattern 1 | Pattern 2 | Pattern 3 | Pattern 4 |
| B - e.g. "0010" | 180° Phase | 180° Phase | 180° Phase | 180° Phase |
| C - e.g. "0011" | 180° Phase | OFF | 180° Phase | OFF |

The dual lamp fixture 10 system also operates as a sub-net of a distributed-network vehicle control system. In such applications, the addressing of the lamp fixtures 10 via switch 46, becomes specific rather than being assigned a group address as discussed above. The microprocessor (not shown) in the distributed control network is in direct communication with the lamp fixture(s) 10 and provides lamp fixture-specific instructions as to what function that lamp is to perform and when to perform that function. While the present dual lamp fixture 10 supports 16 individual addresses, when the fixtures are used as components in sub-networks it should be appreciated that it is possible to have a great number of lamp fixtures synchronously performing even a greater variety of flash patterns.

Although this invention is shown and described with respect to the detailed embodiments thereof, it will be understood by those skilled in the art that various changes in form and detail thereof may be made without departing from the scope of the claimed invention.

We claim:

1. An addressable dual lamp fixture connectable to a communication bus for receiving address-specific command signals from an external source comprising:

a housing;

a reflector within said housing, said reflector having a concave surface and a focal point;

a lens offset from said concave surface and mounted to cover an opening of said housing;

a first lamp of high intensity positioned between said concave surface and said lens;

a second lamp of lower intensity positioned between said concave surface and said lens;

a high intensity lamp drive circuit mounted within said housing in communication with said first lamp, wherein said high intensity lamp drive circuit comprises energizable pulse voltage and trigger voltage networks;

a switching means in communication with said second lamp; and an internal control circuit having an address selection switch for setting an address for said dual lamp fixture mounted within said housing and being in communication with an external control circuit, said high intensity lamp drive circuit and said switching means for respectively actuating said high intensity and lower intensity lamps in a predetermined manner in response to said address-specific command signals generated by said external control circuit.

2. The dual lamp fixture of claim 1 wherein said internal control circuit is further responsive to said external control circuit for providing an output to said external control circuit corresponding to the condition of each of said lamps.

3. The dual lamp fixture of claim 1 wherein said first lamp is a strobe tube.

4. The dual lamp fixture of claim 3 wherein said strobe tube is toroidal.

5. The dual lamp fixture of claim 1 wherein said second lamp is an incandescent lamp.

6. The dual lamp fixture of claim 1 wherein said first lamp and said second lamp are positioned approximately at said focal point of said concave surface of said reflector.

7. The dual lamp fixture of claim 1 wherein said high intensity lamp drive circuit further comprises a flyback circuit.

8. The dual lamp fixture of claim 7 wherein said flyback circuit comprises a voltage regulator.

9. The dual lamp fixture of claim 7 wherein said flyback circuit comprises a current regulator.

10. The dual lamp fixture of claim 1 wherein said pulse voltage network comprises a capacitor and a first resistor in parallel connection with said capacitor.

11. The dual lamp fixture of claim 1 wherein said trigger voltage network comprises a silicon controlled rectifier, a capacitor in communication with said silicon controlled rectifier, and a transformer in series connection with said capacitor.

12. The dual lamp fixture of claim 1 wherein said switching means comprises a field effect transistor and a filter circuit in communication with said field effect transistor.

13. The dual lamp fixture of claim 1 wherein said internal control circuit provides an output corresponding to the functional status of said pulse voltage network.

14. The dual lamp fixture of claim 13, wherein said internal control circuit is in communication with and responsive to a multiplexing circuit.

15. A lighting system for an emergency vehicle comprising:
a plurality of addressable dual lamp fixtures each having an internal control circuit with an address selection switch for setting an address for each of said dual lamp fixtures for performing lighting functions in a predetermined manner in response to externally provided commands and corresponding to address-specific functions; and
an external control circuit for providing said plurality of dual lamp fixtures with commands for performing said address-specific functions.

16. A dual lamp fixture comprising:
a housing;
a reflector within said housing, said reflector having a concave surface and a focal point;
a lens offset from said concave surface and mounted to cover an opening of said housing;
a first lamp of high intensity positioned between said concave surface and said lens;
a second lamp of lower intensity positioned between said concave surface and said lens;
a high intensity lamp drive circuit mounted within said housing in communication with said first lamp, wherein said high intensity lamp drive circuit comprises energizable pulse voltage and trigger voltage networks and a flyback circuit having a current regulator;
a switching means in communication with said second lamp; and
an internal control circuit mounted within said housing and being in communication with an external control circuit, said high intensity lamp drive circuit and said switching means for respectively actuating said high intensity and lower intensity lamps in a predetermined manner in response to command signals.

17. A dual lamp fixture comprising:
a housing;
a reflector within said housing, said reflector having a concave surface and a focal point;
a lens offset from said concave surface and mounted to cover an opening of said housing;
a first lamp of high intensity positioned between said concave surface and said lens;
a second lamp of lower intensity positioned between said concave surface and said lens;
a high intensity lamp drive circuit mounted within said housing in communication with said first lamp, wherein said high intensity lamp drive circuit comprises energizable pulse voltage and trigger voltage networks;
a switching means in communication with said second lamp comprising a field effect transistor and a filter circuit in communication with said field effect transistor; and
an internal control circuit mounted within said housing and being in communication with an external control circuit, said high intensity lamp drive circuit and said switching means for respectively actuating said high intensity and lower intensity lamps in a predetermined manner in response to command signals.

18. A dual lamp fixture comprising:
a housing;
a reflector within said housing, said reflector having a concave surface and a focal point;
a lens offset from said concave surface and mounted to cover an opening of said housing;
a first lamp of high intensity positioned between said concave surface and said lens;
a second lamp of lower intensity positioned between said concave surface and said lens;
a high intensity lamp drive circuit mounted within said housing in communication with said first lamp, wherein said high intensity lamp drive circuit comprises energizable pulse voltage and trigger voltage networks;
a switching means in communication with said second lamp; and
an internal control circuit mounted within said housing and being in multiplexed communication with an external control circuit, said high intensity lamp drive circuit and said switching means for respectively actuating said high intensity and lower intensity lamps in a predetermined manner in response to command signals, and wherein said internal control circuit provides an output corresponding to the functional status of said pulse voltage network.

* * * * *